US012523023B2

(12) United States Patent
Colucci

(10) Patent No.: US 12,523,023 B2
(45) Date of Patent: Jan. 13, 2026

(54) WATER DISPENSING DEVICE WITH INTEGRATED MIXER

(71) Applicant: OSCULATI S.r.l, Milan (IT)

(72) Inventor: Michele Colucci, Genoa (IT)

(73) Assignee: OSCULATI S.r.l., Milan (IT)

( * ) Notice: Subject to any disclaimer, the term of this patent is extended or adjusted under 35 U.S.C. 154(b) by 356 days.

(21) Appl. No.: 18/203,131

(22) Filed: May 30, 2023

(65) Prior Publication Data

US 2024/0141632 A1 May 2, 2024

(30) Foreign Application Priority Data

Oct. 28, 2022 (IT) .......................... 202022000004449

(51) Int. Cl.
*E03C 1/04* (2006.01)
*B05B 1/18* (2006.01)
*B05B 7/04* (2006.01)

(52) U.S. Cl.
CPC .............. *E03C 1/0409* (2013.01); *B05B 1/18* (2013.01); *B05B 7/0408* (2013.01)

(58) Field of Classification Search
CPC .... E03C 1/0401; E03C 1/0402; E03C 1/0403; E03C 1/0404; E03C 1/0409;
(Continued)

(56) References Cited

U.S. PATENT DOCUMENTS 5,735,467 A * 4/1998 Lee ...................... B05B 1/1681
239/447
6,264,121 B1 * 7/2001 McClary ............... B05B 15/654
239/525
(Continued)

FOREIGN PATENT DOCUMENTS

CN 110558884 A * 12/2019 ................ A47K 3/28
EP 1884693 A1 * 2/2008 ................ F16K 3/32
(Continued)

OTHER PUBLICATIONS

Ambassador Marine Universal Collection All Plastic Recessed Shower, White; From Online Retailer "Tisser.net", URL: tisser.net/products-p-637418.html; 3 pages; Product available at least as early as Sep. 2014 (Year: 2014).*

*Primary Examiner* — Darren W Gorman
(74) *Attorney, Agent, or Firm* — Manelli Selter PLLC; Edward Stemberger

(57) ABSTRACT

A water dispensing device with an integrated mixer include a body having an elongated shape and a dispensing head transversal to the body and engaged at the second end of the body. The dispensing head fluidically communicates with the body and is configured to dispense a dispensing flow. The device further includes a mixer housed inside the body and configured to mix, upstream of the dispensing head, first and second water flows having temperatures and/or heat amounts different from each other. The device has a mix control rotational member configured to regulate the mix of the first and second water flows and with a linear motion activation member operating on the dispensing head and configured to enable or prevent the dispensing flow. The mix control rotational member and the linear motion activation member are independently operable from each other.

21 Claims, 8 Drawing Sheets

(58) Field of Classification Search
CPC .......... E03C 1/0412; E03C 2001/0418; E03C 1/042; B05B 1/18; B05B 1/30; B05B 1/3026; B05B 7/04; B05B 7/0408; B05B 9/01; B05B 12/002; B05B 12/0022; B05B 12/0024; B05B 12/0026; B05B 15/63; F16K 11/14; F16K 11/16; F16K 11/161; F16K 11/163; F16K 11/165

See application file for complete search history.

(56) References Cited

U.S. PATENT DOCUMENTS

| | | | | |
|---|---|---|---|---|
| 7,341,209 | B1* | 3/2008 | Ko | F16L 19/0237 |
| | | | | 239/525 |
| 8,550,380 | B2* | 10/2013 | Gautschi | B05B 15/00 |
| | | | | 239/447 |
| 2008/0023576 | A1* | 1/2008 | Boesch | B05B 1/1618 |
| | | | | 239/446 |
| 2010/0084492 | A1* | 4/2010 | Gautschi | B05B 12/004 |
| | | | | 239/525 |
| 2012/0085955 | A1* | 4/2012 | Kim | F16K 11/074 |
| | | | | 251/286 |
| 2016/0160480 | A1* | 6/2016 | Peel | F16K 11/22 |
| | | | | 239/413 |
| 2019/0001350 | A1* | 1/2019 | Huang | F16K 31/445 |

FOREIGN PATENT DOCUMENTS

| | | | | | |
|---|---|---|---|---|---|
| EP | 1918464 | A2 | | 5/2008 | |
| GB | 2320211 | A | * | 6/1998 | .......... E03C 1/0404 |
| KR | 20080002868 | U | * | 7/2008 | .............. E03C 1/05 |
| KR | 20200039484 | A | * | 4/2020 | ............ E03C 1/025 |

* cited by examiner

WATER DISPENSING DEVICE WITH INTEGRATED MIXER

TECHNICAL FIELD OF THE INVENTION

The present invention refers to a water dispensing device, particularly to a shower, and an assembly comprising the water dispensing device and a base apt to house and support it. Moreover, the invention refers to an installation wherein the base is engaged to a wall.

The invention finds a particular application in the nautical field; the water dispensing device is particularly adapted to be used in water vehicles.

Further, the invention can find an application in motor-homes or RV vehicles or similar terrestrial vehicles.

RELATED ART

Showers apt to dispense water are known.

Patent document EP1918464 discloses a shower provided with a substantially cylindrical elongated body provided with two parts which can relatively rotate. In use, these two parts are reciprocally rotated in order to cause cold and hot water to flow and to be mixed together in order to obtain the required temperature. In order to stop the water flow, the parts are reciprocally rotated. A disadvantage of such shower is constituted by the fact that the management of the dispensing and mix of the water are not optimal.

Therefore, the Applicant has observed that the technical solutions of the prior art could be improved.

OBJECTS OF THE INVENTION

Therefore, a main object of the present invention consists of overcoming the inconveniences beforehand described with reference to the prior art.

Therefore, an object of the present invention consists of providing a water dispensing device enabling to optimally manage the mix and dispensing of water.

Further, the invention provides an alternative technical solution having a substantial efficacy, with respect to the prior art solutions.

These and other objects are met by a water dispensing device, by an assembly and by an installation according to the following description, the attached claims and to the following summary.

SUMMARY

The invention refers to a water dispensing device configured to regulate the mix of a first and second water flows having temperatures and/or heat amounts different from each other (the water flows entering the mixing device) independently from the management of the dispensing flow (the water flow mixed at the outlet by the dispensing device). This is made possible by providing a mix control rotation member configured to manage the mix of the flows and a linear motion activation member apt to enable or prevent a dispensing flow, separated and operable independently from each other. The dispensing flow is a mixed water flow, which the first and second water flows are mixed in, which is dispensed by the water dispensing device.

Moreover, the invention refers to an assembly provided with a base configured to house flush the water dispensing device and an installation wherein the base is installed on a wall.

The dispensing device is apt to be used in the nautical field, particularly in water vehicles or in the terrestrial field, particularly in terrestrial vehicles. The main use of the water dispensing device is the sanitary one; a possible secondary use thereof is for cleaning parts of a water or terrestrial vehicle.

In accordance with an embodiment, a water dispensing device (1) with an integrated mixer includes:
- a body (5) having an elongated shape defined along a longitudinal development direction (D1) and developing between a first and second ends (5a, 5b),
- a dispensing head (9) engaged at the second end (5b) of the body (5), the dispensing head (9) being fluidically communicating with the body (5) and being configured to dispense a dispensing flow (FM) in operative conditions, the dispensing head (9) having an elongated shape defined along a main development direction (D2) transversal to the longitudinal development direction (D1) of the body (5),
- a mixer (2) housed inside the body (5) and configured to mix, upstream of the dispensing head and in operative conditions, first and second water flows (FF, FC) having temperatures and/or heat amounts different from each other,
- a mix control rotational member (77) configured to regulate the mix of the first and second water flows (FF, FC), the mix control rotational member (77) being configured to operate among a plurality of rotational positions angularly offset from each other, each rotation position being matched by a respective mix of the flows,
- a linear motion activation member (10) operating on the dispensing head (9) and configured to enable or prevent the dispensing flow (FM), the mix control rotational member (77) and the linear motion activation member (10) being independently operable from each other.

The dispensing head (9) includes a dispensing portion (9') apt to enable the dispensing flow (FM) to outflow, the linear motion activation member (10) and the dispensing portion (9') being opposite to each other with reference to the main development direction (D2) of the dispensing head (9).

The linear motion activation member (10) is engaged inside the dispensing head (9), the dispensing head (9) including first and second ends (9a, 9b) opposite along the main development direction (D2), the dispensing portion (9') and the linear motion activation member (10) being respectively defined at the first and second ends (9a, 9b) of the dispensing head (9).

The mix control rotational member (77) includes:
- a rotation command member (9) configured to rotate, and
- a guide portion (15) rotatively integral with the rotation command member and configured to be engaged with the mixer (2) in order to guide by an integral rotation at least one rotatable portion (7) of the mixer (2) due to the rotation of the rotation command member.

The rotation command member includes the dispensing head (9).

The dispensing head (9) is rotatable with respect to the body (5) and the guide portion includes an intermediate component (15) associated to the dispensing head (9) and facing at least one portion (8) of the mixer (2) and/or a portion of the dispensing head (9) facing at least one portion (8) of the mixer (2).

The intermediate component (15) is a piece distinct from the dispensing head (9) and is integrally engaged with it, the intermediate component (15) being arranged between the dispensing head (9) and a portion (8) of the mixer (2).

The linear motion activation member (10) is associated to and/or engaged with the dispensing head (9).

Each rotational position of the plurality of rotational positions angularly offset from each other corresponds to a different mix between the first and second water flows (FF, FC), the mix being different in terms of temperature and/or amount or flow rate or volume of the first and second water flows (FF, FC) which are mixed.

The dispensing head (9) is configured to rotate by 90° with respect to the body (5).

The dispensing head (9) is configured to rotate with respect to the body (5), from a neutral position or "zero" rotation position of 45° in a first rotation direction and of 45° in a second rotation direction opposite to the first rotation direction.

The dispensing head (9) is configured to rotate for a maximum angular range of 90° with respect to the body (5).

The dispensing head (9) has a seat (9e) configured to house the linear motion activation member (10) and includes a wall delimiting at least partially said seat (9e), the linear motion activation member (10) being configured to take at least:
- one closed configuration wherein it prevents a dispensing flow (FM),
- an activation configuration wherein it enables a dispensing flow (FM), wherein both in the closed configuration and in the activation configuration the linear motion activation member (10) is housed in said seat (9e) and is flush with said wall.

The wall perimetrally delimits said seat (9e).

The linear motion activation member includes a button (10).

The device further includes an indicator (12), the indicator (12) indicating the mix selection or the mix proportion of the first and/or second water flows (FF, FC).

The indicator (12) is defined on a portion of the dispensing head (9) facing the body (5), particularly facing an indicating portion (13) of the body (5).

The body (5) includes a mix indicating portion (13) facing the dispensing head (9), the mix indicating portion (13) including a first element (13a) and a second element (13b), the first and second elements (13a, 13b) being associated to a different temperature and/or heat amount of the mixed water to be dispensed.

The first and second elements (13a, 13b) are symmetrical to each other, particularly they are specular to each other.

The first and second elements (13a, 13b) are respectively associated to a first color, for example blue, indicating cold water, and to a second color, for example red, indicating hot water.

The indicator (12) is configured to rotate with respect to the mix indicating portion (13).

The indicator (12) is configured to rotate integrally with the dispensing head (9).

The device further includes a constrain element (16) configured to prevent the dispensing head (9) of the body (5) from disengaging or being extracted.

The constrain element (16) is of a threaded type, for example is or comprises a grub screw.

The device further includes at least one rotation aiding element (20), for example a bush positioned between the body (5) and a rotatable portion (7) of the mixer (2) and configured to enable a relative rotation between the rotatable portion (7) of the mixer (2) and the body (5).

The constrain element (16) has an end (16a) positioned at a seat defined by the rotation aiding element (20).

The device further includes at least one rotation aiding element (21), for example a bush, positioned between an intermediate component (15) and the body (5), or between the dispensing head (9) and the body (5), and configured to enable the relative rotation between the intermediate component (15) or the dispensing head (9) and the body (5).

The device further includes a first and second rotation aiding elements (20, 21), for example a first and second bushes, the first rotation aiding element (20) being positioned between the body (5) and a rotatable portion (7) of the mixer (2) and the second rotation aiding element (21) being positioned between an intermediate component (15) and the body (5), or between the dispensing head (9) and the body (5).

The mixer (2) includes a diverting cartridge (8) and a ferrule (7) configured to rotate with respect to the diverting cartridge (8) in order to enable to mix the first and second water flows (FF, FC).

The device further includes a cartridge (14) housed inside the dispensing head (9), the linear motion activation member (10) operating on the cartridge (14) in order to enable or prevent the dispensing flow (FM).

The device further includes one or more handle portions (5c) defined on the body (5), preferably, two handle portions (5c) opposite to each other.

The two handle portions (5c) are symmetrically defined on the body (5).

The dispensing head (9) includes a dispensing end (9a) having a plurality of water outlet openings (11) configured to enable the outflow of the dispensing flow (FM).

The main development direction (D2) of the dispensing head (9) is perpendicular to the development longitudinal direction (D1) of the body (5), consequently the dispensing head (9) developing perpendicularly to the body (5).

The device further includes one or more seals (17) arranged between the mixer (2) or an intermediate component (15) and the body (5), each seal (17) being configured to prevent a fluid seepage between the mixer or intermediate component (15) and the body (5).

The reciprocal orientation of the dispensing head (9) and of the body (5) define a substantially hammer shape of the water dispensing device (1), wherein the head of the hammer is defined by the dispensing head (9) and the handle portion of the hammer is defined by the body (5).

The body (5) has an at least partially cylindrical shape.

The body (5) has a tapered portion at or in proximity of the first end (5a).

The water dispensing device is a shower or spray head (1).

The water dispensing device (1) is devised to be used in a water vehicle or in a terrestrial vehicle.

In accordance with another aspect of an embodiment, an assembly (50', 50") includes:
- a water dispensing device as noted above, and
- a base (51', 51") configured to house the water dispensing device (1).

The base (51', 51") has a housing portion (52) configured to house flush the dispensing head (9).

The housing portion (52) is at least partially counter-shaped to the dispensing head (9).

The base (51', 51") includes a body, for example a cylindrically shaped body, having a perimetral portion (53) and at least two sides (54, 55) emerging from and/or transversal to the perimetral portion (53), said sides (54, 55) laterally delimiting the housing portion (52).

In the assembled configuration of the assembly (50', 50"), the water dispensing device (1) is housed by the base (51', 51"), and the water dispensing device (1) has a surface flush with a corresponding surface of the sides (54, 55).

The surface of the water dispensing device (1) is defined at the dispensing head (9).

The surfaces flush with each other are upper surfaces of the sides (54, 55) of the base (51', 51") and of the dispensing head (9).

The dispensing head (9) is configured to take a rest configuration when is housed in the housing portion (52) and does not protrude from the housing portion (52).

The base is a support base (51', 51") apt to support the water dispensing device (1) in the assembled configuration of the assembly (50', 50") wherein the water dispensing device (1) is housed by the base (51', 51").

The base (51', 51") has an engagement portion (56) configured to be engaged with a horizontal wall (101') or a vertical wall (101").

The base (51') is configured to be horizontally installed.

The base (51") is configured to be vertically installed.

The base (51") includes a body provided with a perimetral portion (53) and with a collar (57) developing transversally with respect the perimetral portion (53).

The collar (57) is defined inside an area perimetrally delimited by the perimetral portion (53), the collar (57) having a respective perimetral portion (58) which the sides (54, 55) of the body of the base (51") emerge from.

In accordance with another aspect of an embodiment, an installation (100', 100") includes:
  at least one assembly (50', 50") as noted above,
  a wall (101', 101"), with the base (51', 51") being installed on said wall (101', 101").

The base (51') is horizontally installed on the wall, preferably the wall being a horizontal wall (101').

The base (51") is vertically installed on said wall, preferably the wall being a vertical wall (101").

The base (51', 51") has an engagement portion (56), the engagement portion (56) being engaged with the wall (101', 101").

In accordance with another aspect of an embodiment, a vehicle (1000) includes at least one installation (100', 100").

The vehicle (1000) is a water vehicle and the water vehicle is a vessel.

The vehicle (1000) can be a terrestrial vehicle such as a motorhome or a RV vehicle.

Conventions and Definitions

It is observed that in the following detailed description, corresponding parts/components/elements are indicated by the same numerical references. The figures could illustrate the invention by not to scale representations; therefore, parts/components/elements illustrated in the attached figures and regarding the invention could only refer to schematic representations.

In the context of the present disclosure, the use of terms such as "on", "upper", "above", "below", "under", "at the bottom", "at the side of", "lateral", "laterally", "internal", "internally", "external", "externally", "horizontal", "horizontally", "vertical", "vertically", "frontal", "frontally", "backward", "backwards", "right", "left", similar terms and associated variants refers, save for different specific indications, to at least one spatial orientation the invention can take under conditions of use (see one or more of the attached figures, for example).

Save for different specific indications, the terms "condition" or "configuration" can be interchangeably used in the context of the present disclosure.

Save for different specific indications, terms such as "upstream", "downstream" and similar or derived terms, refer to the arrangement of parts/components/elements with respect to the advancement direction of fluid along a fluid path where such parts/components/elements are positioned.

In the context of the present disclosure, one or more of the following definitions and conventions can be applied, where appropriate and unless otherwise stated and/or unless they are excluded by the context:
  "water dispensing device" means any device configured and/or devised to mix, dispense, and intercept, based on its operative condition, water. Preferably, the water dispensing device is a shower or a spray head. As an example, the water dispensing device can be installed in water vehicles;
  "water vehicle" means any vehicles (vessels, ships, etc.) configured to move on water and/or navigate;
  "terrestrial vehicle" means any vehicles (motorhomes, RV vehicles or similar) configured to move on earth, preferably provided with a water system;
  "flush" means "aligned". Particularly, wherein two components or surfaces are flush with each other, means that such components or surfaces are aligned with each other so that they do not relatively protrude. The alignment can be defined on a plane or along a curvilinear outline.

Said conventions and definitions can be used, when appropriate, to understand the claims. Where appropriate, one or more of said conventions and definitions and/or one or more of the aspects indicated above can be included in one or more of the following claims, particularly when these claims use one or more expressions object of one or more conventions or definitions.

BRIEF DESCRIPTION OF THE DRAWINGS

In order to gain a better comprehension of the invention and appreciate the advantages thereof, following will describes some embodiments thereof in an exemplifying and non-limiting way with reference to the attached figures, wherein.

DETAILED DESCRIPTION OF EMBODIMENTS OF THE INVENTION

Water Dispensing Device

A water dispensing device according to the invention is generally indicated in the figures by numerical reference 1.

The water dispensing device 1 is of a type provided with an integrated mixer 2 configured to mix two entering flows, in other words a cold water flow FF (first water flow) and a hot water flow FC (second water flow) in order to manage them for dispensing an exiting flow FM (dispensing flow). The hot water flow FC and cold water flow FF are expressions which are relative to each other, and they mean water flows having respective temperatures or heat amounts different from each other; therefore, the hot water flow FC will be associated to a temperature and/or heat amount higher than the cold water flow FF. The cold water flow FF and hot water flow FC are typically mixed in the exiting flow FM in order to obtain a temperature and/or heat amount desired by a user of the water dispensing device 1. The water dispensing device 1 has a respective conduit 3, 4 for each entering flow FF, FC.

Figure 3:
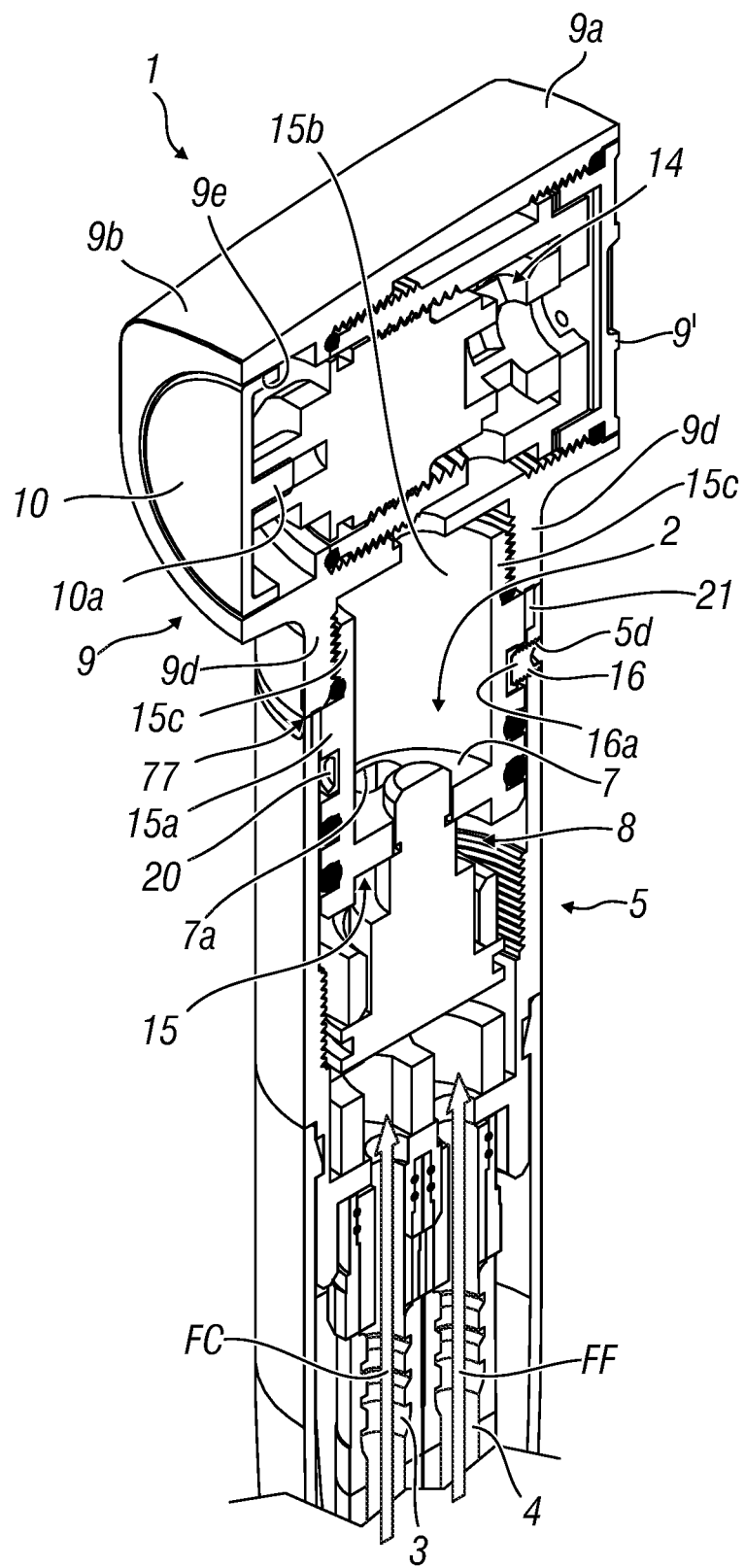
FIG. 3 illustrates a perspective view of a cross-section of the water dispensing device of FIG. 1 (the sectioned components are not hatched for the sake of simplicity)
Figure 4:
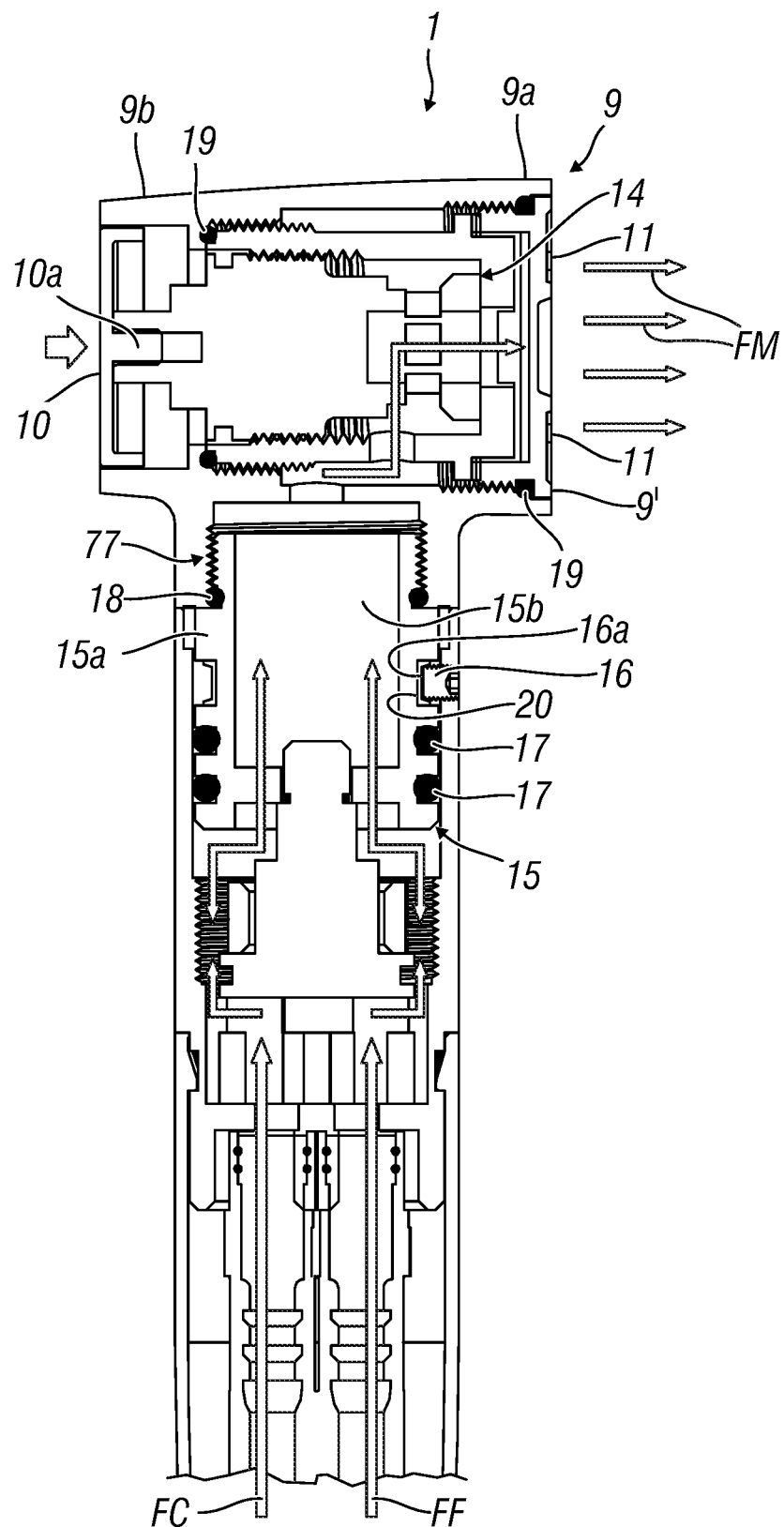
FIG. 4 illustrates the cross-section of FIG. 3, some arrows indicating the water flow inside the water dispensing device and the dispensing flow exiting the dispensing head (the sectioned components are not hatched for the sake of simplicity)

More particularly, the water dispensing device 1 has a body 5 having an elongated shape defined along a longitudinal development direction D1. The body 5 develops between a first and second ends 5a, 5b opposite to each other with reference to the longitudinal development direction D1. As illustrated in the attached figures, the first end 5a can be a lower end of the body and the second end 5b can be a top end of the body. The body 5 has a substantially cylindrical shape having a diameter substantially constant for a substantial extension of a length of the body 5 defined along the longitudinal development direction D1. As illustrated in the attached figures, preferably, the first end 5a is tapered; in such case, the diameter of the body 5 decreases at the first end 5a. The body 5 can be formed by a plurality of portions engaged with each other. The body 5 can comprise one or more handle portions 5c by which the water dispensing device is gripped and handled, in conditions of use, by a user. As illustrated in FIGS. 3 and 4, the body 5 is hollow in order to house the components which will be described in the following, and to enable the water flows to flow.

As beforehand said, the water dispensing device 1 has a first and second water supplying conduits 3, 4 apt to respectively supply the cold water flow FF and the hot water flow FC. The two conduits 3, 4 can be enveloped in a same conduit 6 (or sheath or similar element) defining a slot adapted to house the two water supplying conduits 3, 4. The first end 5a of the body has an opening through which the two water supplying conduits 3, 4 enter.

The water dispensing device 1 comprises a mixer 2 housed inside the body 5 and configured to mix, in operative conditions, the hot water flow FC and the cold water flow FF. The mixer 2 comprises a ferrule 7 and a diverting cartridge 8. The ferrule 7 is configured to rotate with respect to the diverting cartridge 8 in order to enable to mix the cold and hot water flows; for this matter, the ferrule 7 comprises two through openings 7a (FIG. 3 shows one of these two openings). Preferably, the diverting cartridge 8 is a ceramic diverting cartridge. The diverting cartridge 8 can have a diameter of some tens of millimeters, for example 22 mm.

Figure 1:
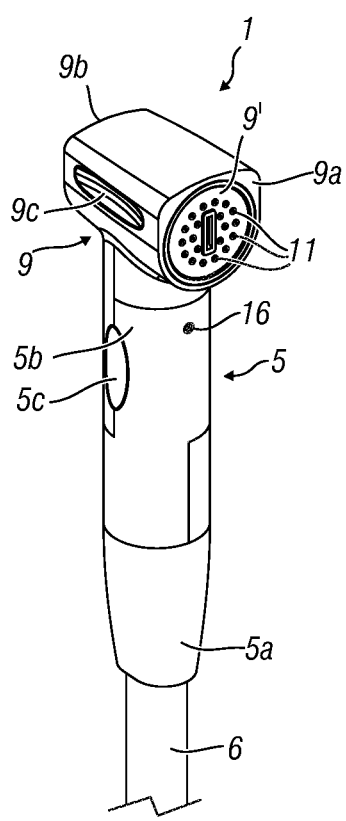
FIG. 1 illustrates a perspective front view of a water dispensing device according to the present invention, the foreground showing the dispensing end of the dispensing head.
Figure 2:
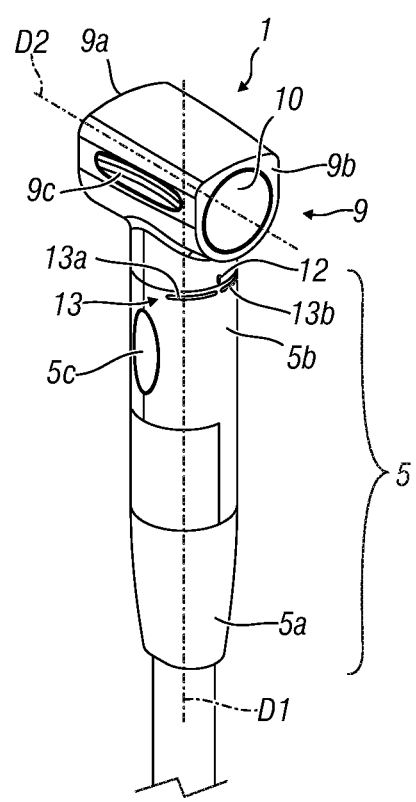
FIG. 2 illustrates a rear perspective view of the water dispensing device of FIG. 1, the foreground showing the linear motion activation member, the indicator, and the mix indicating portion.

Moreover, the water dispensing device 1 comprises a dispensing head 9 configured to dispense, in operative conditions of the water dispensing device 1, the dispensing flow FM; for this matter, the dispensing head 9 is fluidically in communication with the body 5. The dispensing flow FM is a mixed water flow from the mixer 2; therefore, the dispensing head 9 is defined downstream the mixer 2 in the fluid advancement direction. As illustrated in the attached figures, the dispensing head 9 is engaged at the second end 5b of the body 5. The dispensing head 9 has an elongated shape defined along a main development direction D2 transversal, particularly perpendicular, to the longitudinal development direction D1 of the body 5. Therefore, the dispensing head 9 develops transversally, particularly perpendicular, to the body 5. The reciprocal orientation of the dispensing head 9 and of the body 5 defines a substantially hammer shape of the water dispensing device 1, wherein the head of the hammer is defined by the dispensing head and the handle portion of the hammer is defined by the body. The dispensing head 9 has a first and second ends 9a, 9b opposite to each other with respect to the main development direction D2; at the first end 9a it is defined a dispensing portion 9' of the dispensing head 9 and at the second end 9b a linear motion activation member 10 can be housed in a corresponding seat. The dispensing portion 9' is provided with a plurality of water outlet openings 11 configured to enable the dispensing flow FM to outflow from the dispensing head 9; as illustrated in the attached figures, it can be in the shape of an insert housed inside the first end 9a of the dispensing head 9. The dispensing head 9 is configured to rotate with respect to the body 5; preferably, it is configured to rotate by 90° with respect to the body 5. Particularly, from a neutral position or "zero" rotation position (this position is shown in FIG. 2) the dispensing head 9 is configured to rotate with respect to the body by 45° in a first rotation direction (for example clockwise) and by 45° in a second rotation direction (for example counterclockwise) opposite to the first rotation direction. Further, the dispensing head 9 can comprise one or more handle portions 9c apt to aid a user to grip them in order to enable to rotate the dispensing head 9. The handle portions 9c of the dispensing head 9 can be two and can be symmetrical; particularly, each of them can be defined on a respective side of the dispensing head 9 (see FIGS. 1 and 2).

Moreover, the device comprises an indicator 12 facing the body 5 and indicating the selection or of the mix proportion of the first and/or second water flows and an indicating portion of the mixer 13 facing the dispensing head 9. The mix indicating portion 13 comprises a first element 13a and a second element 13b. The first and second elements 13a, 13b are associated to a different temperature and/or heat amount of the mixed water to be dispensed, are specular to each other and are respectively associated to a first color, for example blue, indicating cold water, and to a second color, for example red, indicating hot water. As illustrated in FIG. 2, the indicator 12 is defined on the portion of the dispensing head 9 (which is integral with it) facing the mix indicating portion 13 and the mix indicating portion 13 is defined on the portion of the body 5 facing the indicator 12. The rotation of the dispensing head 9 with respect to the body 5 therefore defines the rotation of the indicator 12 with respect to the mix indicating portion 13, therefore enabling the user to select the desired mix between hot and cold water. The indicator 12 and the mix indicating portion 13 are preferably placed below the second end 9b of the dispensing head 9 (see FIG. 2), therefore below the linear motion activation member 10.

The water dispensing device 1 comprises a valve 14 housed inside the dispensing head 9 and apt to open or close a conduit enabling the outflow of the dispensing flow FM (see the arrow in FIG. 4 which shows how the water flow advances inside the dispensing head); when the conduit is closed water is not dispensed, while when the conduit is open the dispensing flow exits the dispensing head 9. Closing and opening such conduit are enabled by moving a stem housed inside the dispensing head 9. In the attached figures, the valve is in a shape of an ON/OFF type cartridge 14.

The water dispensing device 1 can further comprise an intermediate component 15 associated to the dispensing head 9 and facing a portion of the mixer 2, in other words facing the diverting cartridge 8. The intermediate component 15 is substantially hollow so that a mixed water flow can flow from the mixer 5 towards the dispensing head 9 and has a mantle or cylindrical wall 15a delimiting an internal conduit 15b. The intermediate component 15 exhibits a septum provided with one or more openings apt to let water from the diverting cartridge 8 flow. The septum develops transversally, particularly perpendicular, to the mantle or cylindrical wall 15a; in the embodiment illustrated in the attached figures, the septum consists of the ferrule 7. Substantially, the ferrule 7 is defined at a lower portion of the intermediate component 15. In the embodiments illustrated in the attached figures, the intermediate component 15 is a piece distinct from the dispensing head 9 and is engaged with it and is arranged between the dispensing head 9 and the diverting cartridge 8. The intermediate component 15 and the dispensing head 9 can be engaged by respective threaded portions 15c, 9d, which are made integral with a threaded locker interposed between the threaded portions 15c, 9d, for example a threaded locker substance; analogous threaded and threaded locker portions can be provided on one or more internal surfaces of the dispensing head 9, and one or more components housed inside it, such as the dispensing portion 9' (see FIGS. 3 and 4) in order to reciprocally constrain them. In alternative embodiments not illustrated in the attached figures, the component which is herein identified as the intermediate component 15 can be made in one piece with the dispensing head 9 and therefore can be formed by a lower portion of the dispensing head 9 facing a portion of the mixer 2, in other words facing the diverting cartridge 8.

The water dispensing device 1 has a constrain element 16 configured to prevent the dispensing head 9 from disengaging the body 5. As shown in FIGS. 3 and 4, the constrain element 16 crosses a through seat 5d defined on the body 5 and is engaged with the intermediate component 15 which is integral with the dispensing head 9; it is understood that in alternative embodiments in which an intermediate component 15 is not provided, the constrain element 16 can be directly engaged with the lower portion of the dispensing head 9 facing the seat 5d of the constrain element 16. Substantially, the constrain element 16 prevents the dispensing head 9 from longitudinally moving along the longitudinal development direction D1 of the body 5. The through seat 5d and the constrain element 16 housed in the former are preferably defined oppositely to the mix indicating portion 13 (see FIGS. 1 and 2). Preferably, the constrain element 16 is of a threaded type; in the attached figures, it is implemented by a grub screw 16.

Moreover, the water dispensing device 1 comprises a mix control rotational member 77 having the function of regulating the mix between the flows of hot and cold water FC, FF. The mix control rotational member 77 is configured to operate among a plurality of rotational positions angularly offset from each other, each rotation position being matched by a respective mix of the flows, associated to a respective temperature or heat amount of the flow obtained by the mixing step. The mix control rotational member 77 comprises a rotation command member guiding the rotation and a guide portion which is rotatively guided by the rotation command member. The rotation command member is configured to rotate; the rotation of the guide rotation command member integrally rotatively guides at least one rotatable portion of the mixer 2 by the guide portion. The rotatable portion of the mixer is preferably formed by the ferrule 7 of the mixer 2. In the attached figures, the rotation command member comprises the dispensing head 9; substantially, the dispensing head 9 is the member adapted to command the desired mix by a rotation with respect to the body 5. The guide portion comprises said intermediate component 15, which is associated to the dispensing head 9 and faces the diverting cartridge 8 and/or a portion of the dispensing head 9 facing the diverting cartridge 8. In conditions of use, the user rotates the dispensing head 9 for selecting the desired mix of the hot and cold water flows FC, FF; this in turn rotates with respect to the body 5 and rotatively drags, by its lower portion, the guide portion (which in the attached figures, consists of the intermediate component 15) which causes the rotation of the rotatable portion of the mixer 2 (which, in the attached figures, consists of the ferrule 7) so that it is obtained the desired mix between the hot and cold water flows FC, FF. The rotation of the ferrule 7 with respect to the cartridge 8 (the non-rotatable portion of the mixer) changes the mix between the hot and cold water.

Moreover, the water dispensing device 1 comprises a plurality of seals 17, 18, 19 arranged inside the body 5 and inside the dispensing head 9. Each seal 17, 18, 19 has an annular development. More particularly, two seals 17 arranged between an external surface of the intermediate component 15 and an internal surface of the body 5 are provided; the seals 17 are housed in corresponding annular notches defined on the external surface of the intermediate component 15. The above described two seals 17 are positioned at a lower portion of the intermediate component 15; at an upper portion of the intermediate component 15 it is provided another seal 18 which is housed between an external surface of the intermediate component 15 and an internal surface of a lower portion of the dispensing head 9, at or in proximity of the reciprocally engaged threaded portions 15c, 9d. As illustrated in the attached figures, two seals 19 inside the dispensing head 9 can be also provided, one of them is placed at the first end 9a of the dispensing head 9, while the other is arranged at the second end 9b of the dispensing head 9.

The water dispensing device 1 can further comprise at least one rotation aiding element 20 configured to enable and/or make easier the relative rotation between the intermediate component 15 (or the lower portion of the dispensing head 9) and the body 5. For this matter, a bush 20 can be provided between the body 5 and the rotatable portion 7 of the mixer 2 (the ferrule) and configured to enable the relative rotation between the rotatable portion 7 of the mixer 2 and the body 5. The bush 20 has a concave seat in which an end 16*a* of the grub screw 16 is housed; since the grub screw 16 crosses the body 5 along the through seat 5*d*, such reciprocal arrangement between the grub screw 16 and bush 20 prevents the dispensing head 9 from being extracted from the body 5. The bush 20 has an annular shape.

Moreover, the water dispensing device 1 can comprise a further rotation aiding element 21 positioned between the intermediate component 15 and the body 5 and configured to enable and/or assist the relative rotation between the intermediate component 15 and the body 5. Also, this further rotation aiding element can be a bush 21, as shown in the attached figures. Preferably, the bush 21 has an annular shape.

The water dispensing device 1 further comprises a linear motion activation member 10 operating on the dispensing head 9, and configured to enable or prevent a dispensing flow FM. The linear motion activation member 10 and the mix control rotational member 77 are operable independently from each other. This advantageously enables to activate or deactivate the dispensing of water independently from the management of the mix of the cold and hot water flows FF, FC and viceversa; in the prior art, the independent activation of the mix of hot and cold water and of the dispensing of the mixed water is not possible because such functions are integrated and obtained by a single rotation movement. The linear motion activation member 10 is configured to take a closed configuration by which it prevents the dispensing flow FM, and an activated configuration wherein it enables the outflow of the dispensing flow FM (see FIG. 4); switching between the configurations depends on the motion of the beforehand cited stem housed inside the dispensing head 9 and connected to the linear motion activation member 10. The stem is moved by the pressure of the linear motion activation member 10; the pressure of the linear motion activation member 10 is shown in FIG. 4 by an arrow directed towards it. The linear motion activation member operates on the ON/OFF type cartridge 14 by an activation portion 10*a*; the thrust applied by the activation portion 10*a* on the ON/OFF type cartridge 14 enables to move the stem in order to allow or prevent the dispensing water flow FM. The linear motion activation member 10 is housed in a seat 9*e* defined in the second end 9*b* of the dispensing head 9 and is preferably a button 10. As illustrated in the attached figures, the dispensing head comprises a perimetral wall delimiting the seat 9*e*, and the button 10 is housed, particularly embedded, inside the seat 9*e*. More particularly, the button 10 is housed in the seat 9*e* and is placed flush with the perimetral wall both in the closed configuration and in the activated configuration; this latter, in which the mixed water flow exits the dispensing head 9, is illustrated in FIG. 4. Therefore, being flush with the perimetral wall, corresponding external surfaces of the perimetral wall and of the button 10 are aligned with each other in both the closed and activated configurations of the button 10, and the button does not protrude from the seat 9*e* in any configuration. Substantially, from a configuration in which water does not exit the dispensing head 9 (the cartridge is OFF), pushing for a first time the button opens the conduit which in turn enables the water flow to outflow, pushing for a second time closes it and therefore the outflow of the water flow is interrupted. The movement of the button 10 can be abutted or countered by a spring (not shown in the attached figures) which contributes to maintain the position of the button 10 flush with the wall delimiting its seat 9*e*.

FIG. 4 illustrates the path followed by water inside the water dispensing device 1. The hot water flow FC and the cold water flow FF enter the body 5 through the respective conduits 3, 4 entering at the lower portion of the body 5 (see the corresponding arrows in the lower portion of the body 5); these are suitably mixed by the mixer 2 (see the corresponding arrows crossing the mixer 2) and arrive at the dispensing head 9. In FIG. 4, wherein the activation member 10 is in the activated configuration, the conduit enables to channel the fluid towards the dispensing portion 9'. Here, the mixed water flow is dispersed through the plurality of outlet water openings 11.

Assembly

Moreover, the invention refers to an assembly 50', 50" comprising a water dispensing device 1 of the beforehand described type and a base 51', 51" configured to house the water dispensing device 1. In the assembled configuration of the assembly 50', 50", the water dispensing device 1 is housed in the base 51', 51". The base is a support base 51', 51" apt to support the water dispensing device 1, particularly at the dispensing head 9.

The base 51', 51" is configured to house flush the dispensing head 9; for this matter, it has a housing portion 52. Preferably, the housing portion 52 is at least partially countershaped to the dispensing head 9 (see specifically FIGS. 6, 7, 10, and 11). More particularly, the base 51', 51" comprises a body provided with a perimetral portion 53, for example having a cylindrical shape, and at least two sides 54, 55 opposite to each other and protruding from the perimetral portion 53. The housing portion 52 is defined between the sides 54, 55. In the assembled configuration of the assembly 50', 50", wherein the dispensing head 9 is housed in the housing portion 52, the upper surfaces of the sides 54, 55 and of the dispensing head 9 are flush with each other, in other words they are aligned with each other. The assembled configuration of the assembly 50', 50" corresponds to a rest position of the assembly 50', 50", wherein the water dispensing device 1 is not operative and therefore does not dispense water; in such configuration, the dispensing head 9 is housed in the housing portion 52 and does not protrude from it (see FIGS. 5, 6, 7, 10, 11 and 12).

Providing the dispensing head 52 flush with the base 51', 51", particularly flush with the sides 54, 55 of the base 51', 51", advantageously enables to prevent from having a volume of the dispensing head 9 outside the base 51', 51" and is conducive to increase the aesthetic appearance of the assembly 50', 50".

The base 51', 51" has an engagement portion 56 configured to be engaged with a wall, particularly with a horizontal or vertical wall. The engagement portion 56 can be of a threaded type.

The assembly 50', 50" can be according to a first or second embodiments, according to whether the base 51', 51" is configured to be installed horizontally (first embodiment) or vertically (second embodiment); for this reason, please refer to the following part of the description.

First Embodiment (Horizontal Base)

The first embodiment provides a base 51' configured to be horizontally installed as is shown in Figures from 5 to 9.

Figure 5:
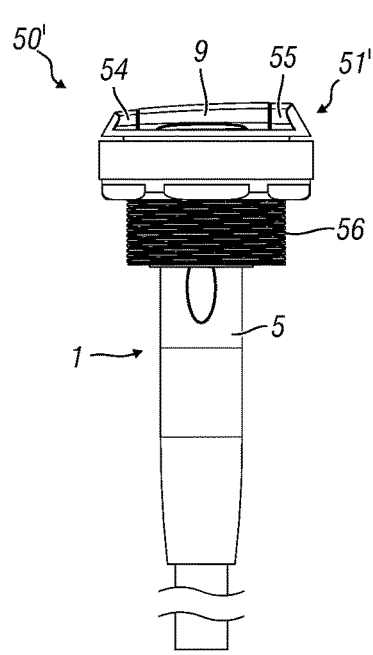
FIG. 5 illustrates a lateral view of an assembly according to a first embodiment of the invention, comprising the water dispensing device of FIG. 1 and a base apt to house the water dispensing device and destined to be horizontally installed.
Figure 6:
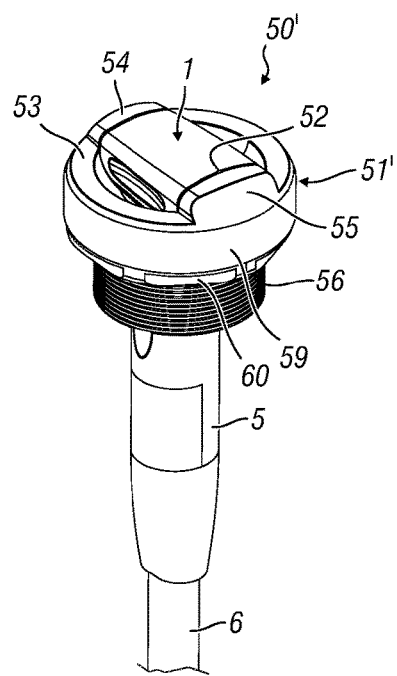
FIG. 6 illustrates a perspective view of the assembly of FIG. 5.
Figure 7:
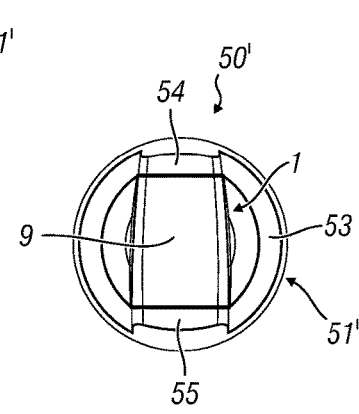
FIG. 7 is a top view of the assembly of FIG. 5, which is rotated by 90° with respect to the view of FIG. 5.
Figure 8:
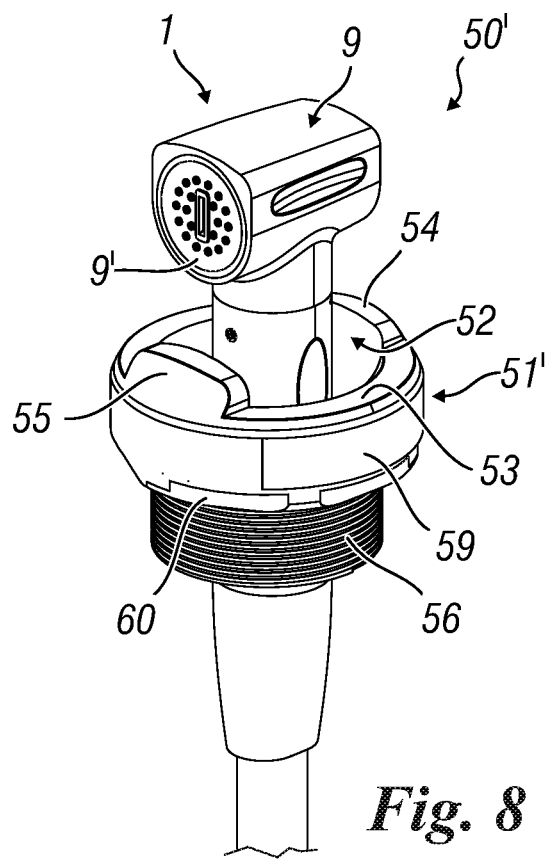
FIG. 8 illustrates the assembly of FIG. 5, wherein the water dispensing device is partially extracted from the base.

In the first embodiment, the upper surfaces of the sides 54, 55 are substantially parallel to the perimetral portion 53 of the base 51', except for a slight inclination of about few degrees with respect to a horizontal plane or wall 101' (particularly see FIG. 5). As shown in FIGS. 5, 6, and 8, the engagement portion 56 is of a threaded type. The base 51' provides a cylindrical wall 59 forming a thickness which can be suitably selected for adapting the base to different thicknesses of the horizontal base 101'. The assembly 50' further provides a ferrule 60 configured to be screwed externally the threaded portion 56 in order the fix the base 51' to the horizontal wall 101'. The cylindrical wall 59 can be formed by a component separated from the ferrule 60 (embodiment illustrated in the attached figures) or by a component in one piece with the ferrule 60.

Second Embodiment (Vertical Base)

The second embodiment provides a base 51" configured to be vertically installed and is shown in Figures from 10 to 13.

In the second embodiment, the base 51" has a collar 57 protruding transversally from the perimetral portion 53, inside a hollow space defined by the perimetral portion 53. The collar 57 is part of the body of the base 51". The collar 57 has a respective perimetral portion 58 from which the sides 54, 55 protrude. The perimetral portion 53 of the base 51" is destined to be vertically installed, in other words aligned with a vertical plane such as a vertical wall 101", while the collar 57 and consequently the sides 54, 55 are destined to be oriented transversally to the vertical plane or wall 101".

Installation

Figure 14:
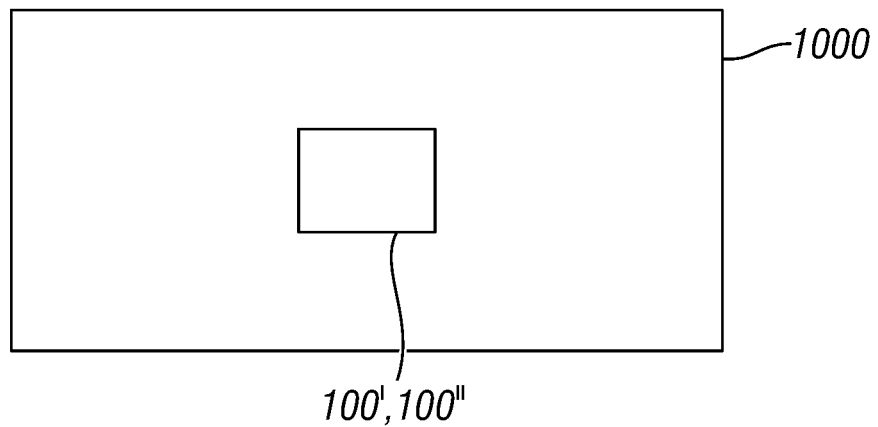
FIG. 14 schematically shows a vehicle comprising an installation according to the invention.

Further, the invention regards an installation 100', 100" comprising at least one assembly 50', 50" of the beforehand described type and a wall 101', 101". The installation provides that the base 51', 51" is installed on the wall 101', 101", particularly by the engagement portion 56. Preferably, the wall is part of a vehicle 1000, that can be a water vehicle or a terrestrial vehicle. Accordingly, the installation 100', 100", is preferably part of the vehicle 1000 (FIG. 14).

The installation 100', 100", based on the type of the assembly 50', 50", can be according to a first embodiment, so that the base 51' is installed on a horizontal wall 101', or according to a second embodiment, so that the base 51" is installed on a vertical wall 101"; clearly, in alternative embodiments, the wall can be inclined, in other words transversal both to a horizontal plane and a vertical plane.

First Embodiment (Horizontal Installation)

Figure 9:
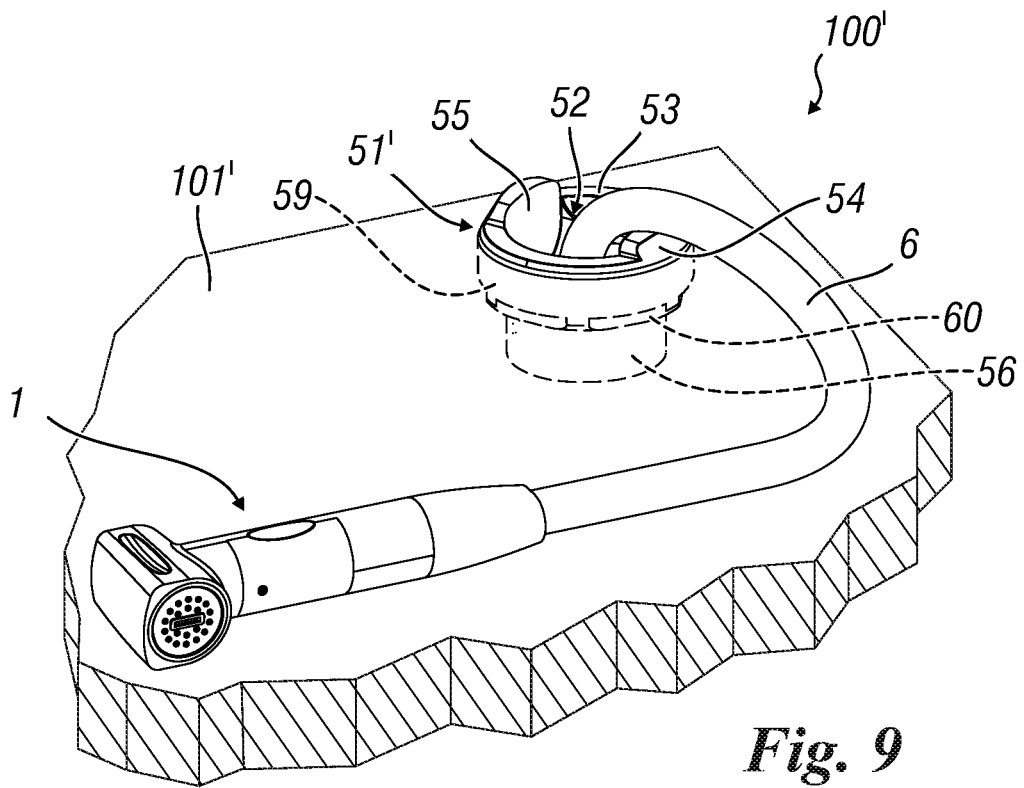
FIG. 9 illustrates an installation comprising the assembly of FIG. 5 and a horizontal wall, wherein the base is horizontally installed on the horizontal wall and the water dispensing device is extracted from the base.
Figure 10:
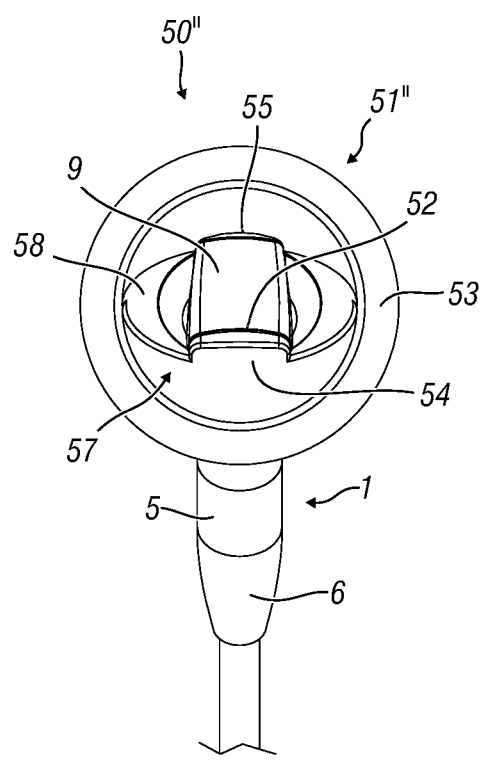
FIG. 10 illustrates a front view of an assembly according to a second embodiment of the invention, comprising the water dispensing device of FIG. 1 and a base apt to house the water dispensing device and destined to be vertically installed.
Figure 11:
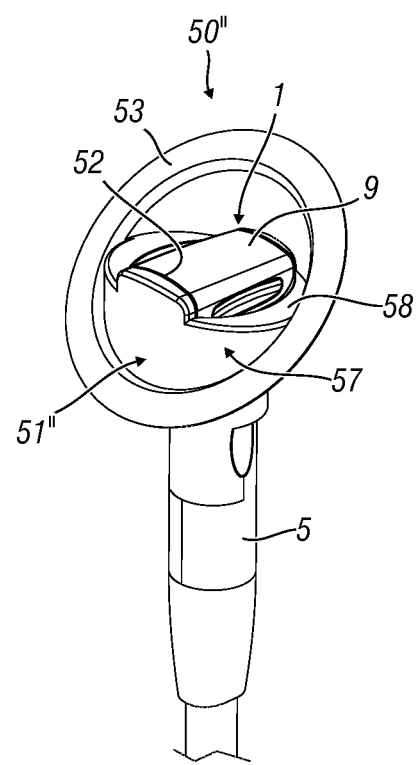
FIG. 11 illustrates a perspective view of the assembly of FIG. 10.
Figure 12:
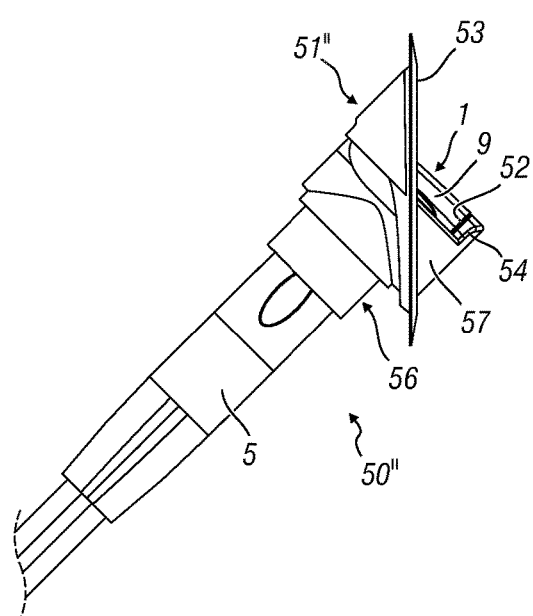
FIG. 12 illustrates a lateral view of the assembly of FIG. 10.

The installation 100', according to the first embodiment, comprises an assembly 50' according to the first embodiment. As illustrated in FIG. 9, such installation 100' comprises a horizontal wall 101' and the base 51' is installed on the horizontal wall 101' by the engagement portion 56 (particularly in FIG. 9 it is embedded in the wall 101'); the perimetral portion 53 of the body of the base 51' is arranged above the horizontal wall 101' and is horizontally oriented.

The method of installing the assembly 50' provides to insert the engagement portion 56 in a suitable hole made in the horizontal wall 101' and to tighten the assembly 50' by screwing the ferrule 60 on the engagement portion 56. In the installed configuration, the ferrule 60 is arranged below the horizontal wall 101', and the cylindrical wall 59 is arranged between the horizontal wall 101' and the ferrule 60 (see FIG. 9). By the provision of the ferrule 60, the assembly can be adapted to different thicknesses of the horizontal wall 101'.

Second Embodiment (Vertical Installation)

Figure 13:
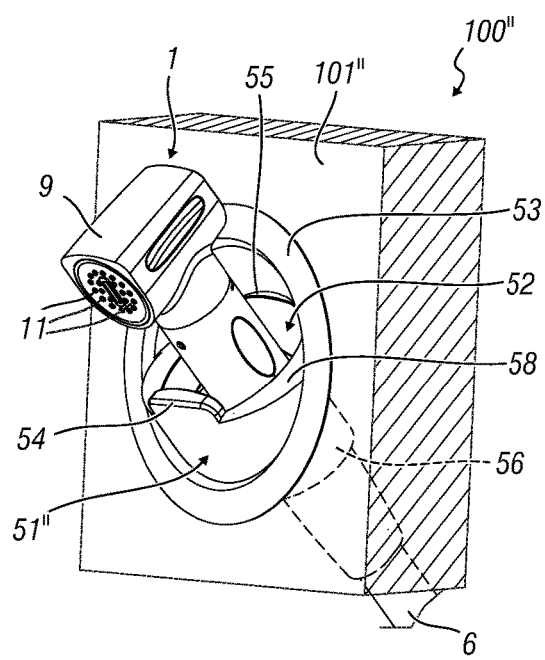
FIG. 13 illustrates an installation comprising the assembly of FIG. 10 and a vertical wall, wherein the base is vertically installed on the vertical wall and the water dispensing device is partially extracted from the base.

The installation 100", according to the second embodiment, comprises an assembly 50" according to the second embodiment. As illustrated in FIG. 13, such installation 100" comprises a vertical wall 101" on which a base 51" is installed by the engagement portion 56 (specifically in FIG. 13 it is embedded in the wall 101"). The perimetral portion 53 of the body of the base 51" is arranged above the vertical wall 101" and is vertically oriented, while the collar 57 and the sides 54, 55 of the base 51" develop transversally to the vertical base 101".

The method of installing the assembly 50" provides to insert the engagement portion 56 in a suitable hole made in the vertical wall 101" and to fix by gluing preferably by a structural silicone or similar substances. The perimetral portion 53 provides a greater gluing useful surface (a surface greater than the one of the first embodiment, which provides the installation by a threaded engagement and not by gluing).

What is claimed is:

1. Water dispensing device with an integrated mixer, the water dispensing device comprising:
    a body having an elongated shape defined along a longitudinal development direction and developing between a first and second ends,
    a mixer housed inside the body and configured to mix in operative conditions, first and second water flows having temperatures and/or heat amounts different from each other,
    a mix control rotational member engaged at the second end of the body, fluidically communicating with the body, and being configured to dispense a dispensing flow in operative conditions, the mix control rotational member having an elongated shape defined along a main development direction transversal to the longitudinal development direction of the body, the mix control rotational member being configured to regulate the mix of the first and second water flows, the mix control rotational member being configured to operate among a plurality of rotational positions angularly offset from each other, each rotational position being matched by a respective mix of the flows,
    wherein the mix control rotational member comprises:
        a rotation command member configured to rotate and engaged at the second end of the body, the rotation command member fluidically communicating with the body and being configured to dispense a dispensing flow in operative conditions, the rotation command member having an elongated shape defined along a main development direction transversal to the longitudinal development direction of the body, and
        a guide portion rotatively integral with the rotation command member and configured to be engaged with the mixer in order to guide by an integral rotation at least one rotatable portion of the mixer due to the rotation of the rotation command member, and
    a linear motion activation member operating on the rotation command member and configured to enable or prevent the dispensing flow,
    wherein the mix control rotational member and the linear motion activation member are independently operable from each other.

2. Device according to claim 1, wherein the rotation command member comprises a dispensing portion apt to enable the dispensing flow to outflow, the linear motion activation member and the dispensing portion being opposite to each other with reference to the main development direction of the rotation command member.

3. Device according to claim 2, wherein the linear motion activation member is engaged inside the rotation command member, the rotation command member comprising first and second ends opposite along the main development direction, the dispensing portion and the linear motion activation member being respectively defined at the first and second ends of the rotation command member.

4. Device according to claim 1, wherein the rotation command member is rotatable with respect to the body and the guide portion comprises an intermediate component engaged with the rotation command member and facing at least one portion of the mixer and/or a portion of the rotation command member facing the at least one portion of the mixer,
wherein the intermediate component is a piece distinct from the rotation command member and is integrally engaged with it, the intermediate component being arranged between the rotation command member and a portion of the mixer,
and wherein the water dispensing device further comprises at least one rotation aiding element, positioned between the intermediate component and the body, or between the rotation command member and the body, and configured to enable the relative rotation between the intermediate component or the rotation command member and the body.

5. Device according to claim 1, wherein the linear motion activation member is engaged with the rotation command member, and
wherein the linear motion activation member comprises a button.

6. Device according to claim 1, wherein each rotational position of the plurality of rotational positions angularly offset from each other corresponds to a different mix between the first and second water flows, the mix being different in terms of temperature and/or amount or flow rate or volume of the first and second water flows which are mixed.

7. Device according to claim 1, wherein the rotation command member is configured to rotate for a maximum angular range of 90° with respect to the body.

8. Device according to claim 1, wherein the rotation command member has a seat configured to house the linear motion activation member and comprises a wall delimiting at least partially said seat, the linear motion activation member being configured to take at least:
one closed configuration wherein it prevents a dispensing flow, and
an activation configuration wherein it enables a dispensing flow,
wherein both in the closed configuration and in the activation configuration the linear motion activation member is housed in said seat and is flush with said wall.

9. Device according to claim 1, further comprising an indicator, the indicator indicating the mix selection or the mix proportion of the first and/or second water flows,
wherein the indicator is defined on a portion of the rotation command member facing a mix indicating portion of the body,
wherein the mix indicating portion faces the rotation command member, the mix indicating portion comprises a first element and a second element, the first and second elements being indicative of different temperatures and/or heat amounts of the mixed water to be dispensed, and
wherein the indicator is configured to rotate with respect to the mix indicating portion integrally with the rotation command member.

10. Device according to claim 1, further comprising a constrain element configured to prevent the rotation command member from disengaging or being extracted.

11. Device according to claim 1, further comprising a cartridge housed inside the rotation command member, the linear motion activation member operating on the cartridge in order to enable or prevent the dispensing flow.

12. Device according to claim 1, further comprising two handle portions that are opposite to each other and are defined symmetrically on the body.

13. Device according to claim 1, wherein the rotation command member comprises a dispensing end comprising a plurality of water outlet openings configured to enable the outflow of the dispensing flow, and
wherein the main development direction of the rotation command member is perpendicular to the longitudinal development direction of the body, consequently the rotation command member developing perpendicularly to the body.

14. Device according to claim 1, wherein the reciprocal orientation of the rotation command member and of the body define a substantially hammer shape of the water dispensing device, wherein the head of the hammer is defined by the rotation command member and the handle portion of the hammer is defined by the body.

15. Device according to claim 1, wherein the water dispensing device is a shower or spray head.

16. Assembly comprising:
a water dispensing device with an integrated mixer, the water dispensing device comprising:
a body having an elongated shape defined along a longitudinal development direction and developing between first and second ends,
a mixer housed inside the body and configured to mix in operative conditions, first and second water flows having temperatures and/or heat amounts different from each other,
a mix control rotational member engaged at the second end of the body, fluidically communicating with the body, and being configured to dispense a dispensing flow in operative conditions, the mix control rotational member having an elongated shape defined along a main development direction transversal to the longitudinal development direction of the body, the mix control rotational member being configured to regulate the mix of the first and second water flows, the mix control rotational member being configured to operate among a plurality of rotational positions angularly offset from each other, each rotational position being matched by a respective mix of the flows,
wherein the mix control rotational member comprises:
a rotation command member configured to rotate and engaged at the second end of the body, the rotation command member fluidically communicating with the body and being configured to dispense a dispensing flow in operative conditions, the rotation command member having an elongated shape defined along a main development direction transversal to the longitudinal development direction of the body, and a guide portion rotatively integral with the rotation command member and configured to be engaged with the mixer in order to guide by an integral rotation at least one rotatable portion of the mixer due to the rotation of the rotation command member, a linear motion activation member operating on the rotation command member and configured to enable or prevent the dispensing flow, wherein the mix control rotational member and the linear motion activation member are independently operable from each other, and a base configured to house the water dispensing device.

17. Assembly according to claim 16, wherein the base has a housing portion configured to house flush the rotation command member, and wherein the housing portion is at least partially counter-shaped to the rotation command member.

18. Assembly according to claim 17, wherein the base comprises a body having a perimetral portion and at least two sides emerging from and/or transversal to the perimetral portion, said sides laterally delimiting the housing portion, in the assembled configuration of the assembly wherein the water dispensing device is housed by the base, the water dispensing device having a surface flush with a corresponding surface of the sides, wherein the mix control rotational member is configured to take a rest configuration when is housed in the housing portion and does not protrude from the housing portion.

19. Installation comprising:

at least one assembly comprising a water dispensing device with an integrated mixer and also comprising a base configured to house the water dispensing device, the water dispensing device comprising:

a body having an elongated shape defined along a longitudinal development direction and developing between first and second ends, a mixer housed inside the body and configured to mix in operative conditions, first and second water flows having temperatures and/or heat amounts different from each other, a mix control rotational member engaged at the second end of the body, fluidically communicating with the body, and being configured to dispense a dispensing flow in operative conditions, the mix control rotational member having an elongated shape defined along a main development direction transversal to the longitudinal development direction of the body, the mix control rotational member being configured to regulate the mix of the first and second water flows, the mix control rotational member being configured to operate among a plurality of rotational positions angularly offset from each other, each rotational position being matched by a respective mix of the flows, wherein the mix control rotational member comprises:

a rotation command member configured to rotate and engaged at the second end of the body, the rotation command member fluidically communicating with the body and being configured to dispense a dispensing flow in operative conditions, the rotation command member having an elongated shape defined along a main development direction transversal to the longitudinal development direction of the body, and a guide portion rotatively integral with the rotation command member and configured to be engaged with the mixer in order to guide by an integral rotation at least one rotatable portion of the mixer due to the rotation of the rotation command member, a linear motion activation member operating on the rotation command member and configured to enable or prevent the dispensing flow, wherein the mix control rotational member and the linear motion activation member are independently operable from each other, and a wall, wherein the base is installed on said wall.

20. Installation according to claim 19, wherein the base is horizontally installed on said wall and the wall is a horizontal wall, or wherein the base is vertically installed on said wall and the wall is a vertical wall.

21. Installation according to claim 19, wherein the installation is part of a vehicle.

* * * * *